US011119223B2

(12) United States Patent
Dill et al.

(10) Patent No.: US 11,119,223 B2
(45) Date of Patent: *Sep. 14, 2021

(54) DEVICE AND METHOD FOR IMPROVING GEOGRAPHIC POSITION ACCURACY OF A GLOBAL POSITIONING SYSTEM-BASED MOBILE DEVICE

(71) Applicant: UNITED STATES OF AMERICA AS REPRESENTED BY THE ADMINISTRATOR OF NASA, Washington, DC (US)

(72) Inventors: Evan T. Dill, Poquoson, VA (US); Russell V. Gilabert, Hampton, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/265,408

(22) Filed: Feb. 1, 2019

(65) Prior Publication Data

US 2019/0243004 A1    Aug. 8, 2019

Related U.S. Application Data

(60) Provisional application No. 62/625,464, filed on Feb. 2, 2018.

(51) Int. Cl.
*G01S 19/41* (2010.01)
*G01S 19/43* (2010.01)
(Continued)

(52) U.S. Cl.
CPC ........... *G01S 19/41* (2013.01); *G01S 19/071* (2019.08); *G01S 19/073* (2019.08); *G01S 19/22* (2013.01); *G01S 19/43* (2013.01)

(58) Field of Classification Search
CPC .......... G01S 19/04; G01S 19/07; G01S 19/22; G01S 19/41; G01S 19/43; G01S 19/44; H01Q 1/246; H04W 4/02
See application file for complete search history.

(56) References Cited

U.S. PATENT DOCUMENTS 5,563,917 A    10/1996  Sheynblat
RE35,498 E  *  4/1997  Barnard ............... G01S 5/0036
(Continued)

FOREIGN PATENT DOCUMENTS

CN    102565816 B  *  10/2013
EP     0574009 A2   *  12/1993  ............. G01S 19/41
JP     09311177 A   *  12/1997

OTHER PUBLICATIONS

R. Hatch, The Synergism of GPS Code and Carrier Measurements, Proceedings of the Third Geodetic Symposium on Satellite Doppler Positioning, vol. 2, p. 1213-1231, 1982 (Year: 1982).*

(Continued)

*Primary Examiner* — Bernarr E Gregory
*Assistant Examiner* — Fred H Mull
(74) *Attorney, Agent, or Firm* — M. Bruce Harper; Andrea Z. Warmbier; Helen M. Galus

(57) ABSTRACT

A device and method which improves the accuracy of a global positioning system (GPS)-equipped mobile device. A time-stamped first set of GPS data is received via a GPS receiver, e.g., of the base station. A second set of GPS data describing a geoposition of the mobile device is received from the mobile device by the base station. A time of collection of the GPS data coincides. The GPS data includes code, carrier-phase, and pseudo-range information from each of the GPS satellites. A predetermined GPS position correction technique is used to generate a first corrected geoposition of the mobile device using the GPS data. Corrected, carrier-smoothed geoposition is generated as a (Continued)

second corrected geoposition using a carrier smoothing operation. The second corrected geoposition is transmitted to the mobile device and/or an external response system such as a drone or first responder.

20 Claims, 5 Drawing Sheets

(51) Int. Cl.
*G01S 19/22* (2010.01)
*G01S 19/07* (2010.01)

(56) References Cited

U.S. PATENT DOCUMENTS

| | | | | |
|---|---|---|---|---|
| 5,663,734 A * | 9/1997 | Krasner | ........... | G01S 19/04 342/357.25 |
| 5,916,300 A * | 6/1999 | Kirk | ........... | G01S 19/44 701/468 |
| 5,928,306 A * | 7/1999 | France | ........... | G01C 21/20 342/451 |
| 5,987,329 A * | 11/1999 | Yost | ........... | H04W 64/00 342/357.31 |
| 6,104,338 A * | 8/2000 | Krasner | ........... | G01S 19/41 342/357.24 |
| 6,198,430 B1 * | 3/2001 | Hwang | ........... | G01S 5/009 342/357.27 |
| 6,229,478 B1 * | 5/2001 | Biacs | ........... | G01S 19/04 342/357.42 |
| 6,844,856 B1 | 1/2005 | Wright | | |
| 7,586,438 B1 * | 9/2009 | Lawrence | ........... | G01S 5/009 342/357.4 |
| 2004/0051700 A1 * | 3/2004 | Pensjo | ........... | G06F 1/1626 345/173 |
| 2004/0253985 A1 * | 12/2004 | Cooper | ........... | H01Q 1/246 455/562.1 |
| 2005/0001763 A1 * | 1/2005 | Han | ........... | G01S 19/44 342/357.31 |
| 2005/0216210 A1 * | 9/2005 | Bartone | ........... | G01S 19/22 702/56 |
| 2006/0267836 A1 * | 11/2006 | Bird | ........... | G01S 19/04 342/357.41 |
| 2012/0176271 A1 * | 7/2012 | Dai | ........... | G01S 19/073 342/357.44 |
| 2014/0184442 A1 * | 7/2014 | Large | ........... | G01S 19/41 342/357.42 |
| 2016/0196525 A1 * | 7/2016 | Kantor | ........... | G08G 5/0013 705/330 |
| 2016/0377730 A1 * | 12/2016 | Drescher | ........... | G01S 19/13 342/357.23 |
| 2017/0269231 A1 * | 9/2017 | Dai | ........... | G01S 19/44 |
| 2017/0332192 A1 * | 11/2017 | Edge | ........... | H04W 4/02 |
| 2018/0120445 A1 | 5/2018 | Dill | | |
| 2018/0199306 A1 * | 7/2018 | Edge | ........... | G01S 19/071 |
| 2020/0174135 A1 * | 6/2020 | Gong | ........... | G01S 19/41 |

OTHER PUBLICATIONS

B.W. Parkinson et al., Global Positioning System: Theory and Applications, vol. 1; Progress in Astronautics and Aeronautics, vol. 164, American Institute of Aeronautics and Astronautics, Inc., p. 547-568, 1996 (Year: 1996).*

B.W. Parkinson et al., Global Positioning System: Theory and Applications, vol. 2; Progress in Astronautics and Aeronautics, vol. 164, American Institute of Aeronautics and Astronautics, Inc., p. 3-50, 1996 (Year: 1996).*

R. Braff, Description of the FAA's Local Area Augmentation System (LAAS), Journal of The Institute of Navigation, vol. 44(4), p. 411-423, Winter 1997-1998 (Year: 1998).*

English Translation of JP 09311177 A (Year: 2000).*

Definition for standard deviation. (1992). Academic Press Dictionary of Science and Technology (4th ed.). Elsevier Science & Technology. Credo Reference: https://search.credoreference.com/content/entry/apdst/standard_deviation/0, 1992 (Year: 1992).*

Navstar GPS Space Segment/Navigation User Interfaces, Interface Specification IS-GPS-200, Revision H, 226 pages, Sep. 24, 2013 (Year: 2013).*

Trimble, Trimble GPS Tutorial—Advanced Concepts, http://www.trimble.com/gps_tutorial/dgps-advanced.aspx, Oct. 2015 (Year: 2015).*

English Translation of CN 102565816 B (Year: 2021).*

Dickman, Jeff et al., "Characterization and Performance of Prototype Wideband Airport Pseudolite Multipath Limiting Antenna for the Local Area Augmentation System," ION, 2003 National Technical Meeting, Jan. 22-24, 2003, TIB—German National Library of Science and Technology, pp. 783-793, Anaheim, CA.

Gilabert, Russell et al., "Location Corrections through Differential Networks (LOCD-IN)," IEEE/ION Apr. 2018, 7 pages.

* cited by examiner

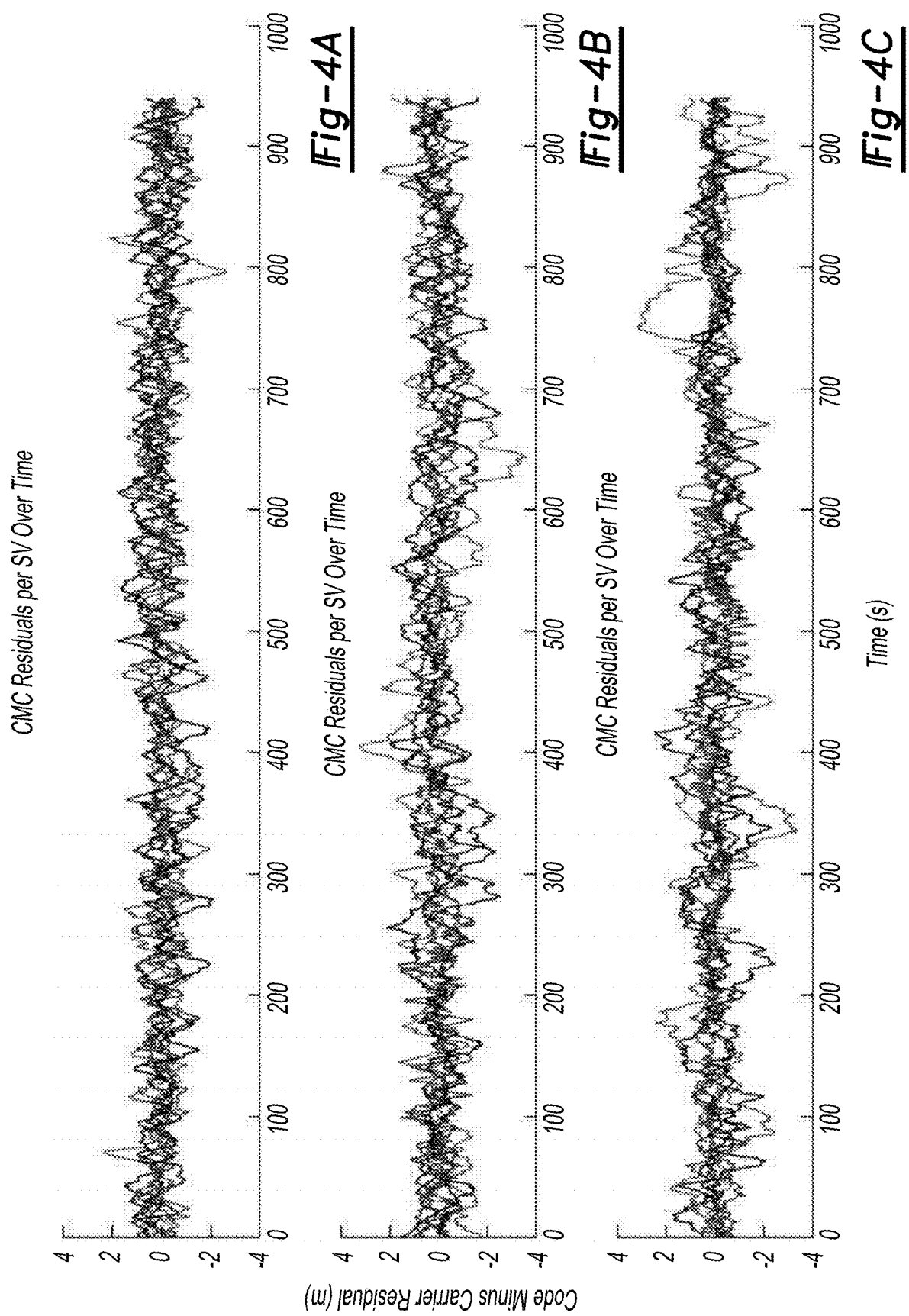

DEVICE AND METHOD FOR IMPROVING GEOGRAPHIC POSITION ACCURACY OF A GLOBAL POSITIONING SYSTEM-BASED MOBILE DEVICE

CROSS-REFERENCE TO RELATED PATENT APPLICATIONS

This patent application claims the benefit of and priority to U.S. Provisional Patent Application No. 62/625,464, filed on Feb. 2, 2018, which is hereby incorporated by reference in its entirety.

STATEMENT REGARDING FEDERALLY SPONSORED RESEARCH OR DEVELOPMENT

The invention described herein was made by employees of the United States Government, and may be manufactured and used by or for the Government of the United States of America for governmental purposes without the payment of any royalties thereon or therefor.

BACKGROUND OF THE INVENTION

Cell phones, tablet computers, and other mobile devices are often equipped with Global Positioning System (GPS) chipsets and receivers, and thus use built-in GPS capabilities for a variety of beneficial purposes. GPS is a worldwide satellite-based navigation system that relies on an earth-orbiting constellation of satellites to precisely identify the geographic position ("geoposition") of a GPS-equipped mobile device. Geoposition can be determined in either two dimensions, i.e., latitude and longitude, or three dimensions (latitude, longitude, and altitude) depending on the number of orbiting GPS satellites in view of the GPS-equipped device. Each GPS satellite continuously broadcasts GPS data in the form of a navigation message. An onboard atomic clock is used to time-stamp the navigation message. The time difference between broadcast and receipt of the time-stamped navigation message is then used to calculate approximate distances between the GPS-equipped device and the orbiting GPS satellites.

The quantity and variety of mobile applications using onboard GPS capabilities has exploded in recent years. However, positioning accuracy of the lightweight, low-cost, and low-power GPS receivers and associated chipsets used in modern mobile devices is limited. Research suggests that available positioning accuracy for a typical handheld mobile device is around 5-20 meters depending on the receiving device. While such levels of accuracy are more than adequate for performing general navigation and other common GPS-based applications, higher levels of accuracy may be required in certain applications, for instance when conducting drone-based package delivery services, gaming, or search-and-rescue/first responder dispatch efforts.

A typical GPS receiver uses a self-generated pseudo-random code to determine the transit time of unique pseudo-random codes ("pseudo-codes") emitted by each orbiting GPS satellite, with such data containing the above-noted navigation message. The term "pseudo-range" refers to uncorrected distance measurements that are based on a correlation between the satellite-emitted pseudo-codes and a locally-generated code of the GPS receiver or mobile device equipped therewith. In addition to code information, some receivers are able to accurately measure the carrier-phase from the GPS satellites. On the ground, therefore, carrier-phase processing techniques may be used that utilize the GPS satellite's carrier frequency, typically higher than the pseudo-random code frequency, to more accurately calculate the geoposition of the GPS receiver. Carrier frequencies may be 1575.42 MHz, i.e., the "L1" carrier frequency, or 1227.60 MHz (the "L2" carrier frequency).

GPS positional correction techniques include Differential GPS and Real-Time Kinematic (RTK) GPS, as well as techniques similar to those used in the Local Area Augmentation System (LAAS). Such techniques help remove atmospheric distortion and other errors common to coinciding GPS data measurements of stationary base stations and the GPS-equipped mobile device, to the extent that such errors correlate. While carrier frequency-based correction techniques such as RTK and LAAS tend to be more accurate than pure differential techniques that rely solely on the code information/pseudo-code data and pseudo-range information, the possible distances between the mobile device and a proximate base station are more limited with such techniques. For example, differential techniques may be used up to about 90-100 km from a base station on certain applications, while RTK techniques and techniques used in LAAS may be usable up to about 30 km, albeit at additional cost and complexity relative to implementation of basic differential techniques.

Efforts have been made toward improving positioning accuracy of a GPS-equipped mobile device of the types noted generally above. Using communication between one or more stationary base stations and the mobile device, existing GPS accuracy of the mobile device is improved as needed. One such approach is disclosed in U.S. patent application Ser. No. 15/665,716, which published as US 2018/0120445 A1 on May 3, 2018, and which is hereby incorporated by reference in its entirety. Such location correction methods also effectively correct for a variety of error types, such as atmospheric error, receiver noise, and GPS satellite clock bias. However, existing approaches may be less than optimal when employed in cities or other highly reflective environments in which the navigation messages from the orbiting satellites may be reflected from intervening structure before being received by the mobile device.

BRIEF SUMMARY OF THE INVENTION

A method is disclosed herein for improving upon available accuracy of a global positioning system (GPS)-equipped, internet-enabled mobile device, e.g., a smart phone or a tablet computer. The present method may be particularly beneficial when used in highly-reflective environments such as cities and urban environments. The disclosed approach enables enhanced multi-path mitigation. As used herein, the term "multi-path mitigation" refers to improvement of GPS-based position accuracy when GPS signals take multiple paths from orbiting GPS satellites to a receiver of the mobile device. That is, while line-of-sight (LOS) is the shortest possible distance between satellite and device, in a highly reflective environment one or more of the LOS paths may be obstructed by intervening manmade or natural objects such as tall buildings, bridges, or snow-covered mountains. GPS signals transmitted in such an environment arrive at the mobile device indirectly after one or more instances of signal reflection. As a result, the reflected GPS signals must travel over longer distances than the ideal LOS distance, thereby producing range error. Additionally, the small receivers used in lightweight handheld mobile devices tend to have high levels of receiver noise. Both range error and receiver noise are reduced using the disclosed method, and therefore the present disclosure is an improvement to the functioning of a computer-based network in the context of GPS positioning.

The present approach may be used when satellite carrier-phase data is made available to fixed (stationary) base stations and the GPS-equipped mobile device. The mobile device is in remote communication with one or more fixed base stations, with measurements from multiple earth-orbiting GPS satellites being available. Each base stations, being stationary, has a known/reference geoposition, i.e., a surveyed latitude, longitude, and altitude.

The method according to an example embodiment includes determining a geoposition of a fixed base station as a reference GPS position using a time-stamped first set of GPS data. The method may include determining, over an internet connection, a time-stamped second set of GPS data describing the mobile device's geoposition. A time of collection of the time-stamped first and second sets of GPS data coincide, i.e., the times of collection are exactly the same.

The method may include generating a corrected geoposition of the mobile device using a predetermined GPS position correction technique, and using the time-stamped first and second sets of GPS data, and a chipset or processor of the base station or the mobile device. As part of the process, a carrier signal smoothing operation is performed before or after initially correcting the geoposition into a first corrected geoposition. The carrier smoothing operation may be performed either in real-time or post-processing. Thereafter, the corrected, carrier-smoothed geoposition is used as a second corrected geoposition to control an action of the mobile device and/or an external response system such as a drone or first responder as set forth herein.

The above-noted predetermined GPS position correction technique may include differential GPS, Real Time Kinematic (RTK), or other techniques similar to those used in a Local Area Augmentation System (LAAS)/Ground Based Augmentation System (GBAS).

These and other features, advantages, and objects of the present disclosure will be further understood and readily apparent from the following detailed description of the embodiments and best modes for carrying out the disclosure by referring to the specification, claims, and appended drawings.

BRIEF DESCRIPTION OF THE SEVERAL VIEWS OF THE DRAWINGS

FIGS. 4A, 4B and 4C are code-minus-carrier (CMC) residuals over time for three example base stations, with CMC residuals depicted in meters on the vertical axis and time in seconds depicted on the horizontal axis.

Figure 1:
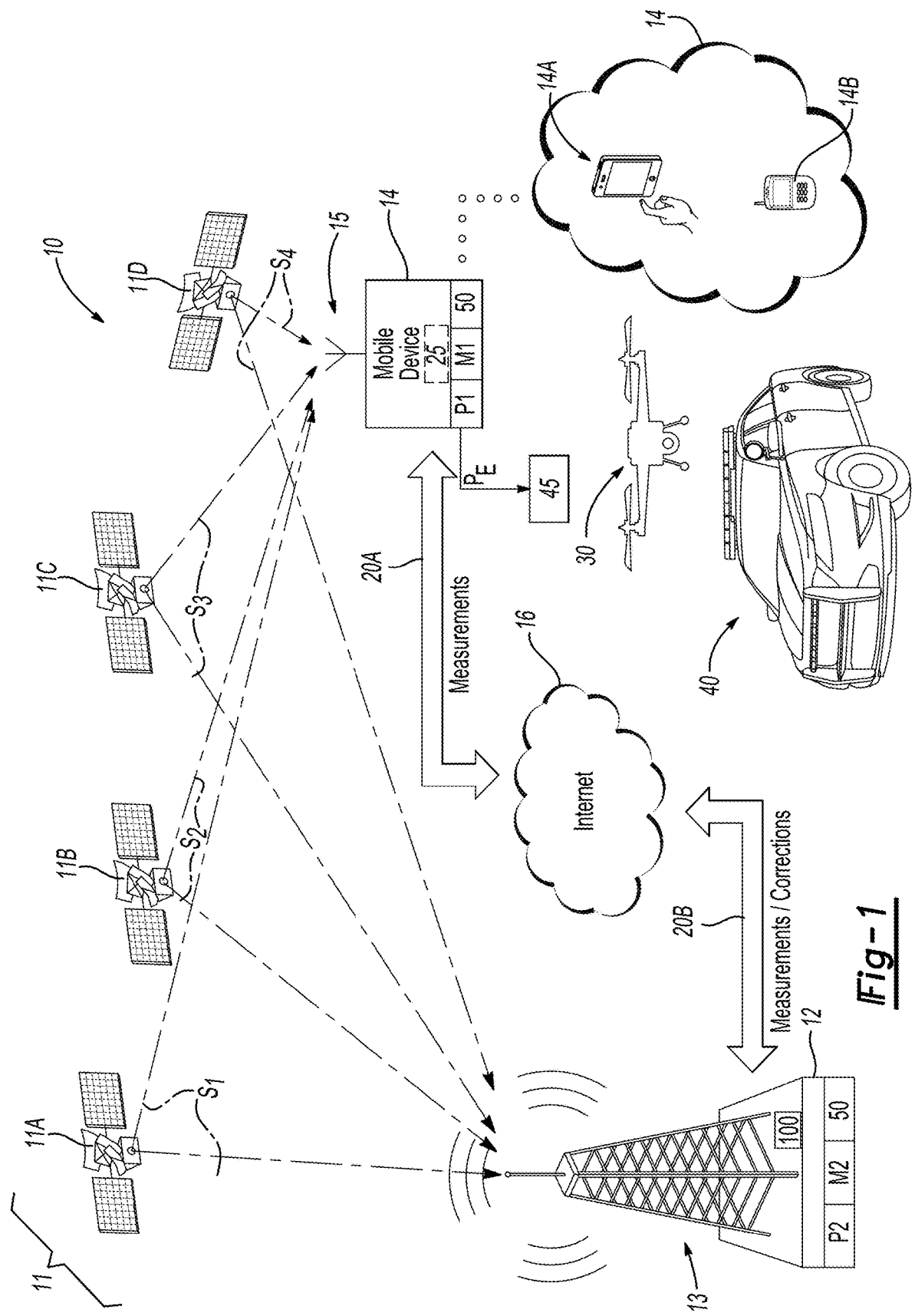
FIG. 1 is a schematic illustration of a system according to an example embodiment in which example differential correction or Real Time Kinematic (RTK) techniques are employed along with a carrier signal smoothing process to situationally improve global positioning system (GPS) accuracy of a GPS-equipped mobile device.

The present disclosure is susceptible to various modifications and alternative forms, and some representative embodiments are shown by way of example in the drawings. It should be understood that novel aspects of this disclosure are not limited to the particular forms illustrated in the appended drawings. Rather, the disclosure is intended to cover all modifications, equivalents, combinations, and alternatives falling within the scope and spirit of the disclosure as defined by the appended claims.

DETAILED DESCRIPTION OF THE INVENTION

Disclosed herein are method and system for increasing global positioning system (GPS)-based positional accuracy of internet-capable cell phones, tablet computers, and other GPS-equipped mobile devices. The disclosed method takes situational advantage of available GPS data and other measurements, including carrier-phase information in particular. Such GPS data is provided over an internet or other wireless connection/radio frequency communication from one or more stationary base stations having a surveyed or otherwise predetermined geoposition.

Referring to FIG. 1, an improved Location Corrections through Differential Networks or "LOCD-IN" system 10 includes one or more stationary base stations 12 in remote networked communication with a global positioning system (GPS)-equipped mobile device 14, e.g., a tablet computer 14A, a cell phone 14B, or other portable electronic device. The mobile device 14 is equipped with a chipset or processor (P1), memory (M1), and a GPS receiver 15. The base station 12 and the mobile device 14 are in remote communication with an Earth-orbiting constellation of GPS satellites 11, shown as four representative GPS satellites 11A, 11B, 11C, and 11D.

Depending on orbital paths, times of day, and line-of-sight (LOS) obstructions, more or fewer GPS satellites 11 may be within LOS of the mobile device 14 at any given time. The base stations 12 are stationary and therefore have a predetermined/surveyed three-dimensional reference geospatial position or "geoposition" in terms of latitude, longitude, and altitude. Each base station 12 includes an antenna or other GPS receiver 13, along with a processor (P2) and memory (M2). The mobile device 14, being mobile, has a time-varying geoposition as a user of the mobile device 14 moves relative to the fixed base station 12.

Figure 3A:
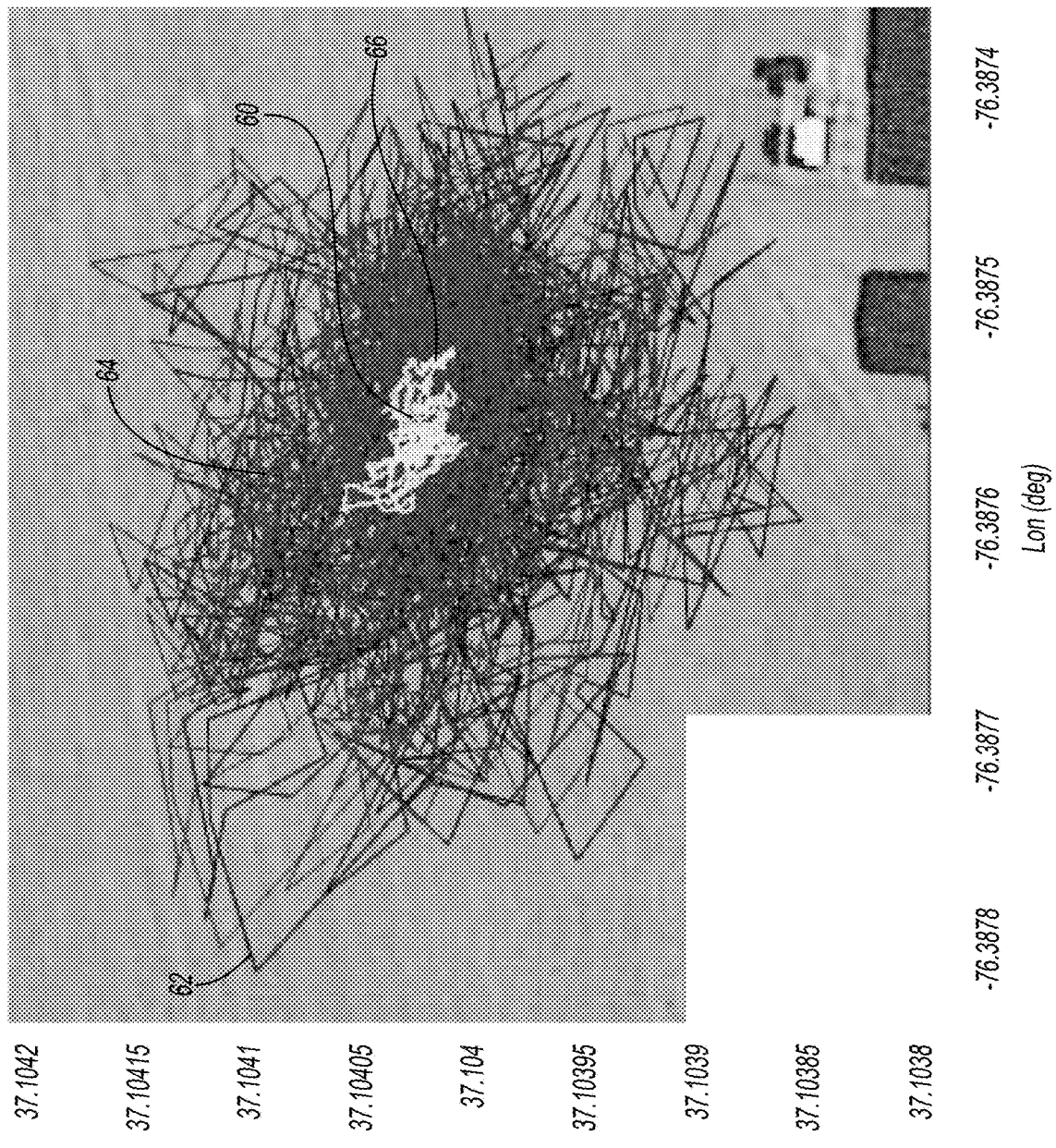
FIGS. 3A and 3B are schematic illustrations of exemplary position solutions for uncorrected, corrected, and smoothed-and-corrected positions for a GPS-equipped mobile device.

A single base station 12 and mobile device 14 are shown in FIG. 1 solely for the purpose of illustrative simplicity. Those of ordinary skill in the art will appreciate that multiple similarly configured base stations 12 and mobile devices 14 may be used in other embodiments, with an example of such an embodiment shown in FIG. 3 and described below. Therefore, singular descriptions provided herein with respect to the number of base stations 12 or mobile devices 14 are intended to apply equally to multiple base stations 12 or mobile devices 14 when used as part of the system 10.

The LOCD-IN system 10 of FIG. 1 is configured to situationally, i.e., upon request, improve upon existing levels of GPS location accuracy of the mobile device 14. As noted above, the GPS accuracy or resolution of the mobile device 14 may be limited due to restrictions on packaging size, weight, or power requirements of the mobile device 14. Such restrictions tend to result in the use of lower cost, lower performance receivers 15 and processors (P1) aboard the mobile device 14. For everyday GPS applications such as turn-by-turn navigation or social media-based location reporting, the uncorrected GPS-based positional resolution may be sufficient. However, situations may periodically arise in which the available GPS position accuracy of the mobile device 14 is inadequate.

Figure 2:
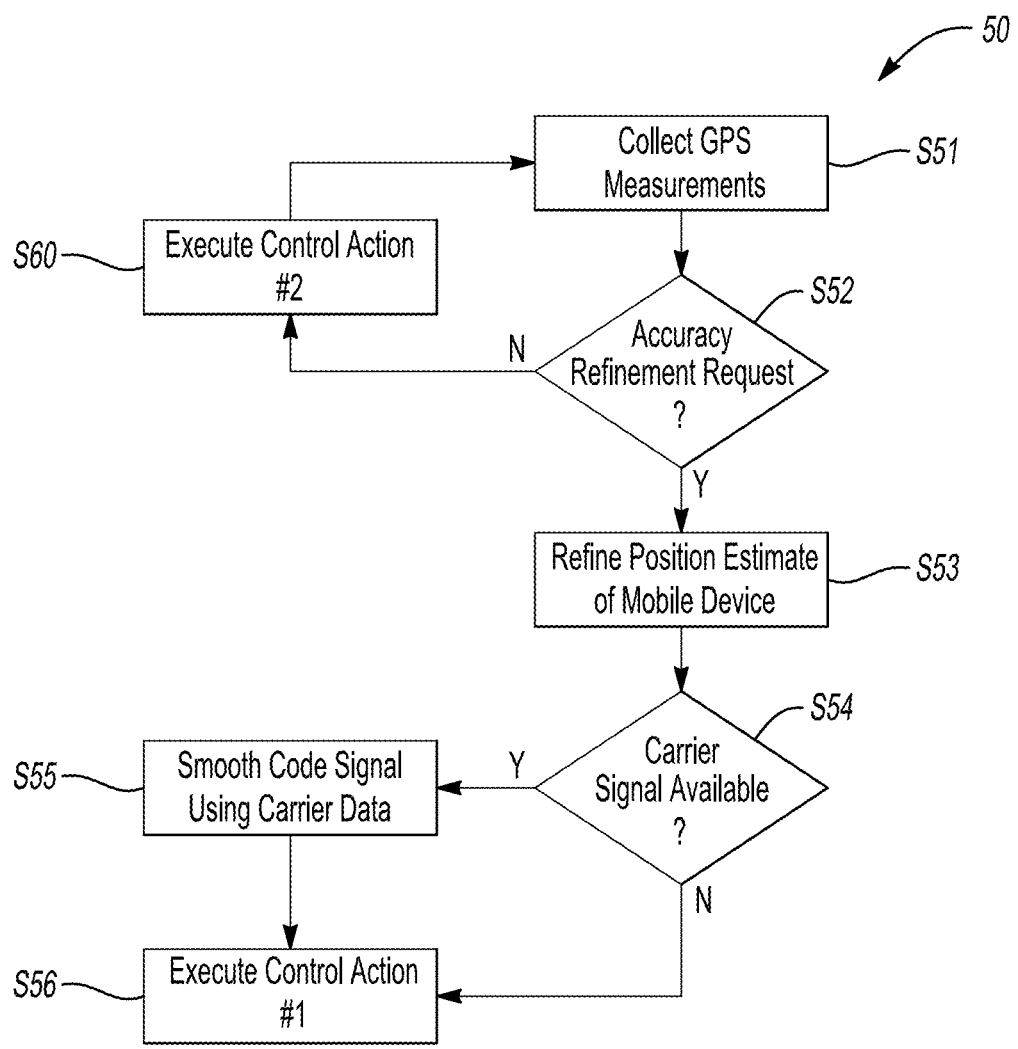
FIG. 2 is a flow chart describing an example method for situationally improving upon GPS positioning accuracy of a mobile device using the system depicted in FIG. 1.

An example of such a situation is a scheduled aerial delivery of a package to a specific mailing address, e.g., via an autonomous or remotely piloted drone 30. Another example may be that of a first responder 40, such as a police squad car as shown, search and rescue teams, firefighters, or emergency medical services requiring a more precise knowledge of the geoposition of the mobile device 14. When improved accuracy is required, whether prompted by the base station 12 or initiated by a user of the mobile device 14, the user may request execution of the present method 50 for processing on the mobile device 14 and/or via the base station(s) 12, and/or via a server or other remote device. In executing the method 50, an example of which is shown in FIG. 2, a carrier signal from the GPS satellites 11 is used by code-smoothing logic 100 to smooth the pseudo-code signals received from the GPS satellites 11 to further improve accuracy beyond levels possible using existing location correction techniques. Although not always necessary, such an accuracy improvement request may be generated in some embodiments by touching a touch screen-displayed activation icon 25 on the mobile device 14 or by pressing a physical button (not shown).

Still referring to FIG. 1, the base station 12 and the mobile device 14 separately receive UPS data signals (arrows $S_1$, $S_2$, $S_3$, $S_4$) from the UPS satellites 11A, 11B, 11C, and 11D, with such data embodying the "navigation messages" noted elsewhere above. The receiver 15 and processor P1 of the mobile device 14 together identify an uncorrected geoposition of the mobile device 14 to a second level of accuracy that, due to the lower cost and size of the receiver 15 and processor P1, is less than the first level of accuracy of the base station 12. Thus, the base station 12 serves as a reference/surveyed geoposition and data source to situationally correct for errors in the available geoposition accuracy of the mobile device 14, doing so without requiring hardware modification to the low-cost receiver 15 and associated processor P1 of the mobile device 14.

In the depicted embodiment of FIG. 1, the mobile device 14 determines its own geoposition via communication with each GPS satellite 11, whether LOS or via reflection from intervening structure or topography. Thereafter, the mobile device 14 automatically refines the GPS-based position estimates using unprocessed measurements (arrows 20A and 20B) as transmitted by the base station 12 through an internet connection 16, including enhancing position via the code-smoothing logic 100 using available GPS carrier signal data. In other embodiments, onboard processing may be performed by the mobile device 14, such that the base station 12 relays its own geoposition as a set of GPS measurements and the mobile device 14 performs the necessary correction techniques using the processor P1. The code-smoothing logic 100 may reside in the base station(s) 12 as shown, and/or in the mobile device 14 in different embodiments.

When using measurements from the GPS satellites 11, the receivers 13 and 15 establish or confirm the respective geopositions of the base station 12 and the mobile device 14, doing so in part by determining pseudo-ranges to each of the orbiting GPS satellites 11. The base station 12 may thereafter transmit its determined pseudo-ranges and/or pseudo-code information to the mobile device 14, or vice versa, with subsequent calculations performed by the processor of the receiving device, for instance the processor P1 of the mobile device 14. The base station 12 and/or the mobile device 14 may thereafter execute a suitable control action using the corrected geoposition of the mobile device 14 after performing the specific code-smoothing logic 100 set forth below. For example, a response system 45 may be embodied as the drone 30 or the first responder 40, in which case the corrected geoposition (arrow $P_E$) may be transmitted to the drone 30 or first responder 40 to more accurately direct the drone 30 or first responder 40 to the user of the mobile device 14, or a location specified by the user of the mobile device 14.

Alternatively, the base station 12 of FIG. 1 may use Real-Time Kinematic (RTK) correction to improve geoposition accuracy of the mobile device 14. RTK functions by determining a number of carrier cycles between the GPS satellites 11 and each of the mobile device 14 and base station 12, and thereafter multiplying the number of carrier cycles by the known carrier wavelength as reported by the GPS satellites 11. The optional RTK embodiment of the present system 10 thus adds carrier-phase GPS information to the available pseudo-range and code information noted above.

RTK techniques may be used to remove errors that are common to both the base station 12 and the mobile device 14, such as clock errors of the GPS satellites 11 or the base station 12 or mobile device 14, ionosphere errors, and/or atmospheric noise. Phase measurements may be used after correcting for such common errors in order to determine the geoposition of the mobile device 14 in a Cartesian reference frame, within a few centimeters of accuracy in some instances depending on the quality of the GPS receiver 15 and the chipset (P1). In the present application, GPS accuracies of 1-2 m or less may be possible and sufficient without modifying the low-cost receiver 15 and processor P1 of the mobile device 14.

Other embodiments not shown in FIG. 1 but contemplated herein include correction techniques similar to those of the Local Area Augmentation System (LAAS) to improve GPS accuracy relative to the differential and RTK techniques described above. LAAS, now more commonly referred to as the Ground Based Augmentation System (GBAS), is most often used to provide corrections to aircraft in the vicinity of an airport. A typical LAAS/GBAS facility may include collocated GPS receivers, a processor/CPU/chipset, and a VHF Data Broadcast (VDB) transmitter. Orbiting aircraft include a GPS receiver, VHF antenna, and an associated chipset. The base station 12 thus uses the available VHF link to transmit GPS corrections to the aircraft.

For instance, the base station 12 is able to average the slightly different GPS position measurements from each of the multiple GPS receivers 13 to thereby minimize common error between the GPS receivers 13. Multiple collocated GPS receivers 13 in close proximity to each other, such as within a few meters, may be used in such an approach to function as a larger and more accurate base station 12 relative to the more limited configuration of FIG. 1. As with RTK, the correction processes used by LAAS/GBAS are more accurate but also tend to be more expensive than basic differential correction techniques. Therefore, LAAS/GBAS may be used when increased accuracy is required and justified by the tradeoff in cost.

FIG. 2 is a flow chart describing an example embodiment of the present method 50 when used with the LOCD-IN system 10 of FIG. 1. Beginning with step S51, method 50 commences after or shortly before establishing an internet or other remote connection between the fixed base stations 12 and the mobile device 14. As part of step S51, the method 50 may include collecting GPS measurement data from the GPS satellites 11 via one or more of the base stations 12, with a geoposition of each fixed base station 12 previously determined and recorded as a surveyed/reference GPS position. A time-stamped first set of GPS data is received from each GPS satellite 11 as part of this process. Step S51 may include receipt of the GPS signals S1, S2, S3, and S4 via the GPS receiver 13 of the base station 12 shown in FIG. 1, and multiple other base stations 12 (not shown) spaced apart from each other, concurrently with receipt of the signals S1, S2, S3, and S4 by the GPS receiver 15 of the mobile device 14. The method 50 then proceeds to step S52.

At step S52, the method 50 includes detecting or otherwise determining whether an accuracy refinement request has been made that is indicative of a desire for a GPS location of the mobile device 14 with more precision that is available using existing location correction techniques. Step S52 may include having a user of the mobile device 14 touch or swipe the icon 25 shown in FIG. 1 as a user-initiated action. In other embodiments, the request may be generated automatically and/or remotely, e.g., by the response system 45, the base station 12, or another remote entity such as a web site, warehouse, police dispatcher, etc. The method 50 proceeds to step S60 when refinement of the GPS accuracy of mobile device 14 is not desired. The method 50 continues to step S53 in the alternative when a request for improved accuracy of the GPS location of the mobile device 14 is detected.

Step S53 includes refining the GPS location estimates of the mobile device 14 using one or more of the predetermined GPS position correction techniques noted above, i.e., Differential Correction, RTK, or LAAS. Such techniques are understood by those of ordinary skill in the art and thus not disclosed in detail herein. The method 50 proceeds to step S54 after the mobile device 14 and/or the base station 12 have executed the predetermined geoposition correction technique.

Step S54 includes determining, via the mobile device 14 and/or the base stations(s) 12, whether satellite carrier signal information or data is available to the receivers 13 and/or 15 as provided by the satellites 11. Currently, only a select number of mobile devices 14 allow user access to raw GPS measurements. Of these, raw GPS data support is generally limited to pseudo-range with varying support of carrier phase measurements. In an example application, a GOOGLE NEXUS 9 tablet computer may be used as the mobile device 14 due to its ability to measure both raw L1 pseudo-range and carrier-phase information. In such an application, a developer-written or commercially available application, such as the GOOGLE GNSSLogger application for ANDROID, may be used to capture raw GPS or other Global Navigation Satellite System (GNSS) measurements. While most mobile devices 14 do not currently allow access to raw GPS measurements, it is expected that such data will become more readily available in future mobile devices, and thus the number of applications benefiting from the method 50 may increase over time.

The method 50 of FIG. 2 proceeds to step S55 when carrier-phase information is available, and directly to step S56 when such data is not available.

Step S55 entails using the code-smoothing logic 100 of FIG. 1 to smooth or otherwise correct for errors in the pseudo-code information using available carrier-phase information. Step S55 may be executed via the base station(s) 12 and/or the mobile device 14 in various embodiments, although the code-smoothing logic 100 is depicted as part of the base station 12 in FIG. 1 for simplicity. As part of the carrier smoothing operation of step S55, the base station 12 and/or the mobile device 14 may solve the following equation:

$$PR_{sm}(k) = \frac{N_f - 1}{N_f} \cdot (PR_{sm}(k-1) + \Delta\Phi(k)) + \frac{1}{N_f} PR(k)$$

where:

$PR_{sm}$ is the smoothed pseudo-range measurement, i.e., the solution being sought in step S55, $N_f$ is the filter time window, $\Delta\Phi$ is the change in carrier-phase information, and PR is the corrected pseudo-range measurement of the mobile device 14. An example suitable for use in executing S55 is disclosed in R. Hatch, "The synergism of GPS code and carrier measurements", in *Proceedings of the Third International Geodetic Symposium on Satellite Doppler Positioning*, Vol. 2 (1982), pp. 1213-1231, which is hereby incorporated by reference in its entirety. The method 50 then proceeds to step S56.

At step S56, the method 50 may include executing a suitable control action (Control Acton #2), e.g., of the mobile device 14, the drone 30, or the external response system(s) 45 of FIG. 1 using the refined/corrected-and-smoothed geoposition from step S55. For example, step S54 may include controlling an action of the drone 30 or response system 45 of FIGS. 1 and 2 responsive to the corrected geoposition.

Step S60 involves executing a control action (Control Action #2) using unsmoothed but corrected geoposition of the mobile device 14. As noted above, existing position accuracy, with or without predetermined location correction techniques, is sufficient for a wide range of applications, with the enhanced positional accuracy enabled by code-smoothing and steps S53 and S55 further improving such accuracy when such improvements are desired.

Thus, the method 50 involves determining if carrier-phase information is available to the base stations 12 and/or mobile device 14, and then accomplishing position enhancement to smooth the code information using such carrier-phase data, e.g., Carrier Smoothed Code or CSC. The rationale behind using a carrier measurement to smooth a pseudo-range measurement is that the carrier measurement is less susceptible to multi-path and receiver noise compared to code data, and thus can be used to smooth/enhance the pseudo-range measurement. The desired result is a position solution with less noise and error as detailed below with reference to FIGS. 3A-4C.

Moreover, smoothing an available code measurement with carrier-phase measurements is useful when applied to lower size, weight, power, and cost (SWaP-C) receivers, such as those used in small mobile devices such as the mobile device 14, as the noise associated with their code measurements tends to be high. Smoothing of the code measurement using carrier measurements may be applied after the previously described differential, RTK, or GBAS-like corrections have been applied to the position solution. However, CSC techniques may be applied before such corrections or in a standalone manner, and therefore the order of the method 50 may vary from that which is depicted in FIG. 2.

Example Test Scenario

In an illustrative example test scenario of the present teachings, raw GPS measurements were captured via the mobile device 14 at six different ground locations, each of which is located anywhere from about 0.2 km to 4 km away from the nearest base station 12. The six ground locations were chosen to provide sufficient variation of sky visibility and distances from three different base stations 12. In the example embodiment described with reference to FIGS. 3A-4C, for instance, the following parameters were used:

| LOCATION | SKY COVERAGE | APPROX. DISTANCE |
|---|---|---|
| 1 | Partial: buildings and foliage | 0.102 km |
| 2 | Partial: buildings and foliage | 0.022 km |
| 3 | Unobstructed | 1.128 km |
| 4 | Partial: buildings | 0.132 km |
| 5 | Minimal: foliage | 0.165 km |
| 6 | Partial: buildings and foliage | 4.0 km |

The three base stations 12 were set up and configured to continuously monitor and log raw GPS measurements. For each test location (1-6), the mobile device 14 was placed on a tripod and the GNSSLogger application noted above was used to log data for approximately 15 minutes. The GPS data from the mobile device 14, along with the GPS data from the base stations 12 used during the 15-minute interval, were offloaded to a computer for post-processing. The ephemeris data used for both base station correction generation and the position solution for the mobile device 134 were predetermined.

In order to determine the amount of error reduction possible using the method 50, pseudo-range corrections were generated and applied to the GPS data from the mobile device 14, e.g., as part of step S53 described above with reference to FIG. 2. The pseudo-range corrections from the three base stations 12 were applied to the pseudo-range measurements of the mobile device 14, resulting in three position solutions. The average error relative to a surveyed/true position was then calculated for each solution, as well as the uncorrected solution and the solution reported by the chipset of mobile device 14.

Additionally, a Code Minus Carrier (CMC) analysis, described below, was performed on the data from each base station 12 during the observational period of the mobile device 14. This analysis was used to categorize the amount of error on the code measurements for each base station 12 and help determine which base station 12 should be used to generate corrections. Lastly, a solution was produced by smoothing the code measurements of the mobile device 14 using the CSC technique described above before applying corrections from the base station 12 showing the least amount of error on its corresponding code measurements as determined by the CMC analysis.

Base Station Correction Generation

Pseudo-range corrections from the base stations 12 were generated for each epoch of data during mobile device 14 observation at the noted test locations. The pseudo-range corrections were produced by subtracting a true range to the satellite 11, with the true range calculated using the satellite positions and the surveyed positions of the base stations 12, from the measured pseudo-range of the GPS receiver 13 of base stations 12:

$$\Delta R = PR_{meas} - TR_{calc}$$

where $\Delta R$ is the base station 12 correction, $PR_{meas}$ is the measured pseudo-range of the base station 12, $TR_{calc}$ is the calculated true range based surveyed location of the receiver 13 of the base station 12. After reception of the predetermined corrections by the mobile device 14, which corresponds to step S53 of method 50, the corrections $\Delta R$ were added to the pseudo-ranges as measured by the mobile device 14 for the observational period.

Base Station Correction Application

Only pseudo-range measurements from the GPS satellites 11 visible for the entire observational period were used in deriving the position solution to remove satellites 11 that were not consistently tracked and/or whose data were found to degrade the quality of the solution. Corrections from each base station 12 at the corresponding time epochs were applied to the pseudo-range measurements from the GPS receiver 15 of the mobile device 14 to produce three solutions:

$$PR_{cor} = PR_{meas} - \Delta R$$

where $PR_{cor}$ is equal to the corrected pseudo-range measurement, $PR_{meas}$ is the original pseudo-range measurement of the tablet, and $\Delta R$ is the generated base station correction. An example process for performing this particular step, see Dickman et al., "*Characterization and Performance of a Prototype Wideband Airport Pseudolite Multipath Proceedings of the* 2003 *National Technical Meeting of The Institute of Navigation*", Anaheim, Calif., 2003, pp. 783-793.

Code-Minus-Carrier Analysis

As part of the approach of method 50, a code-minus-carrier (CMC) function may be performed by the base stations 12 and/or the mobile device 14 to help choose the base station 12 from which measurements should be taken and corrections or smoothing operations performed. In the illustrated test example, CMC analysis was performed on each base station 12 during the observation period of the mobile device 14 to assess the error characteristics of the pseudo-range measurements at each base station 12. The results of this analysis were used to determine which base station 12 corrections should be used. For each observation, the standard deviation of the CMC residuals was produced for each GPS satellite 11. The sum of standard deviation of the CMC residuals was then used to identify the base station 12 having the lowest amount of error on its measurements. Finally, the solution was smoothed using the smoothing technique described above with reference to step S54.

Test Results

For the above-noted location (1), the solution with the lowest error on the average position was obtained when corrections from base station #3 were applied. This was also the base station 12 having the lowest error on its pseudo-range measurements as seen by the sum of the STD CMC residuals. When the solution was smoothed and corrected with corrections from base station #3, a solution was produced with a slight increase to the average error and a reduced standard deviation. The error of the smoothed and corrected solution was larger than the position reported by the mobile device 14 but remained an improvement when compared to its uncorrected position. This result could possibly be due to the effect of multi-path and scattering from surrounding buildings and foliage at this particular location.

For test location (2), the solution with the lowest average error was produced using corrections obtained from base station #3, which was the base station 12 with the lowest sum of STD CMC residuals. A solution with a lower average error was produced when smoothed and corrected using corrections from base station 3 compared to the position reported by the mobile device 12 and the uncorrected solution. The standard deviation was improved when compared to the uncorrected solution and similar when compared to the reported position of mobile device 12.

The solution with the lowest error for test location (3) was obtained when corrections were applied from base station #1. This base station 12 had the lowest sum of STD CMC residuals of the three. The average error of this solution was less than both the uncorrected and reported device solution's average error. The smoothing and correcting of the position had minimal impact on the average error of the position and improved the standard deviation. Various position solutions for a true location 60 are depicted in 3A, i.e., uncorrected 62, corrected 64, and smoothed and corrected 66.

The CMC residuals can be seen below in FIGS. 4A-C of the three base stations 12, used for location (3). Each line represents the amount of additional error on the pseudo-range measurement for each satellite 11. The amount of error is visibly lower on measurements from base station (1) compared to base stations (2) and (3).

Figure 3B:
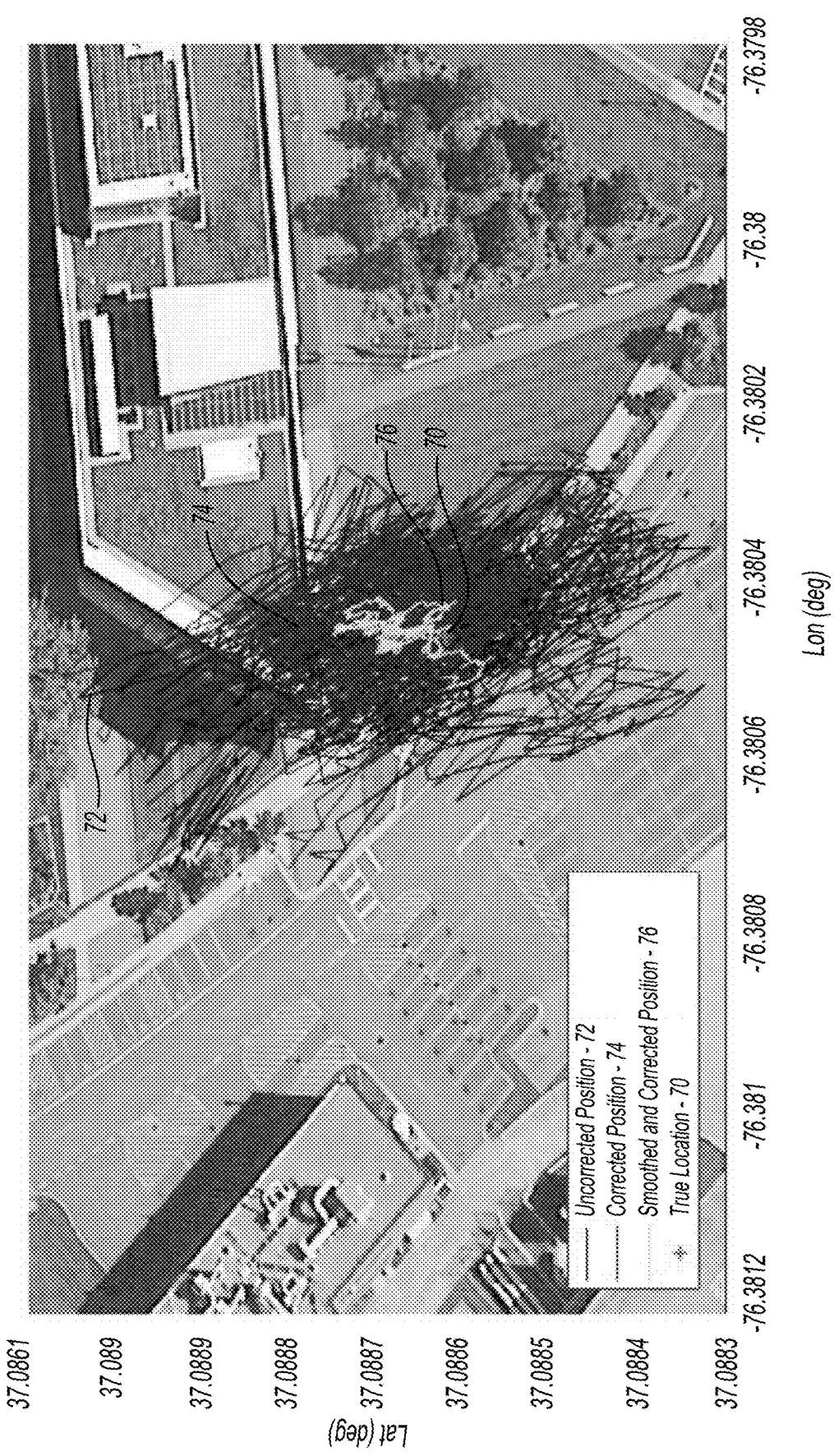

For location (4), the average error was lowest on the uncorrected solution. Although, the solution with the next lowest average error was obtained using corrections from the base station 12 with the lowest sum of STD CMC residuals. The average error of this solution was lower than the reported solution of the mobile device 14. The standard deviation was reduced when compared to both the uncorrected and device reported solutions. The lack of improvement over the uncorrected solution may be due to multi-path error obtained by the nearby building at this location. Various position solutions for a true location 70 are depicted in FIG. 3B, i.e., uncorrected 72, corrected 74, and smoothed and corrected 76.

For location (5), the lowest average error for this location was obtained using corrections from base station #3. This base station 12 had the lowest sum of STD CMC residuals. The average error and standard deviation of the smoothed and corrected solution were both reduced compared to the uncorrected and reported solutions of the mobile device 14.

For location (6), the solution with the largest improvement was obtained when corrections from base station #1 were applied. This base station 12 had the lowest sum of STD CMC residuals. The average error and standard deviation of the smoothed and corrected position were smaller than both the uncorrected and device reported solutions.

Results Summary

| LOCATION | Avg. Error Reduction: Corrected vs. Uncorrected | Avg. Error Reduction: Smoothed Corrected vs. Device-Reported Solution |
| --- | --- | --- |
| 1 | 5.537 m | −3.384 m |
| 2 | 1.668 m | 2.049 m |
| 3 | 1.796 m | 1.325 m |
| 4 | −3.564 m | −1.542 m |
| 5 | 1.637 m | 1.334 m |
| 6 | 0.401 m | 3.278 m |

For all of the test locations (1)-(6), position corrections applied from the base station 12 with the lowest sum of STD CMC residuals over test interval produced a position with reduced average lateral error when compared to the uncorrected solution for all but one tested location. Additionally, the application of the differential corrections had a minimal effect on the standard deviation of the computed position for each test location. This result may be due to the high noise of the pseudo-range measurements that are not common to the pseudo-range measurements obtained from the base stations 12. However, the smoothing of the pseudo-ranges using the CSC technique greatly reduced the standard deviation of the solution with little impact to the overall average solution error gained through differential correction alone. Thus, when the entirety of the processes disclosed herein are taken into account, both the average error and standard deviation of a geoposition of mobile device 14 are reduced and a more accurate solution made available.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for improving geographic position (geoposition) accuracy of a global positioning system (GPS)-based, internet-equipped mobile device, the method comprising:

in response to a user input to the mobile device indicative of a request for improved GPS location accuracy of the mobile device, wherein the mobile device is a cell phone, a tablet computer, or other portable electronic device, and wherein the mobile device is configured to receive the user input and to generate an accuracy improvement request and transmit the accuracy improvement request to the selected base station to obtain a correction in response to the user input to the mobile device:

selecting a base station from a plurality of base stations using a code-minus-carrier (CMC) function via the mobile device;

establishing by processing on the mobile device an internet connection between the mobile device and the selected base station, transmitting the accuracy improvement request to obtain a correction from the selected base station, wherein the selected base station has a reference GPS position determined using a respective time-stamped first set of GPS data from each of a plurality of GPS satellites; and receiving the reference GPS position over the established internet connection; determining a time-stamped second set of GPS data describing a geoposition of the mobile device, wherein a time of collection of the time-stamped first and second sets of GPS data coincide, and wherein the time-stamped first and second sets of GPS data each includes respective code phase information, carrier-phase information, and pseudo-range information from each of the GPS satellites;

generating, via a chipset or a processor of the mobile device processing, a first corrected geoposition of the mobile device using a predetermined GPS position correction technique and the time-stamped first and second sets of GPS data;

in response to the time-stamped first and second sets of GPS data including carrier-phase information, selectively performing a carrier-smoothing operation on the first corrected geoposition using code-smoothing logic of the mobile device to smooth the code phase information using the carrier-phase information and thereby generate a second corrected geoposition of the mobile device; and controlling an action of the mobile device and/or an external response system using the second corrected geoposition of the mobile device.

2. The method of claim 1, wherein performing the carrier-smoothing operation includes the mobile device solving an equation comprising:

$$PR_{sm}(k) = \frac{N_f - 1}{N_f} \cdot (PR_{sm}(k-1) + \Delta\Phi(k)) + \frac{1}{N_f} PR(k)$$

where $PR_{sm}$ is a smoothed pseudo-range measurement, $N_f$ is a filter time window, $\Delta\Phi$ is a change in the carrier-phase information, and PR is a corrected pseudo-range measurement of the mobile device.

3. The method of claim 1, wherein the predetermined GPS position correction technique is a differential correction technique.

4. The method of claim 1, wherein the predetermined GPS position correction technique is a Real-Time Kinematic (RTK) technique using the code phase information, the pseudo-range information, and the carrier-phase information.

5. The method of claim 1, wherein controlling the action includes the mobile device transmitting to the external response system the second corrected geoposition of the mobile device, wherein the external response system includes an unmanned aerial vehicle or a drone.

6. The method of claim 1, wherein controlling the action includes the mobile device transmitting to the external response system the second corrected geoposition of the mobile device, wherein the external response system includes a first responder system.

7. The method of claim 1, wherein the predetermined GPS position correction technique is a Real-Time Kinematic (RTK) technique that includes:
determining a number of carrier cycles between the GPS satellites and each of the mobile device and base station; and
multiplying the number of carrier cycles by a carrier wavelength as reported by the GPS satellites.

8. The method of claim 1, wherein receiving the reference geoposition includes the portable mobile device receiving the time-stamped first sets of GPS data from the base station as unprocessed measurements, the method further comprising the portable mobile device processing the received time-stamped first sets of GPS data.

9. The method of claim 1, wherein the external response system includes a drone and/or a first responder, and wherein the controlled action includes directing the drone and/or the first responder to the portable mobile device.

10. The method of claim 1, wherein selecting the base station from the plurality of base stations includes:
applying the CMC function to the base stations to determine a respective error characteristic of a respective pseudo-range measurement at each of the base stations;
for each of the respective error characteristics, determine a standard deviation of a CMC residual for each of the GPS satellites; and
identify which of the plurality of base stations has a lowest amount of error in the respective pseudo-range measurement.

11. The method of claim 1, wherein determining the time-stamped second set of GPS data includes:
receiving, via the portable mobile device, respective time-stamped second sets of GPS data from the GPS satellites, and
calculating, via the portable mobile device, the geoposition of the portable mobile device based on the received time-stamped second sets of GPS data to a second level of accuracy less than a first level of accuracy of the reference GPS position of the selected base station.

12. A stationary base station having a reference geoposition, the stationary base station comprising:
a global positioning system (GPS) receiver configured to receive a respective time-stamped first set of GPS data from each of a plurality of Earth-orbiting GPS satellites;
a chipset or a processor in communication with the GPS receiver; and
memory on which is recorded instructions that, when executed by the processor, cause the stationary base station, in response to receipt of an accuracy improvement request signal from a GPS-equipped and internet-equipped mobile device, the mobile device being configured to generate the accuracy improvement request and transmit the accuracy improvement request to the selected base station to obtain a correction in response to a received user input, the memory to:
establish an internet connection with the mobile device in response to the stationary base station being selected by the mobile device from a plurality of base stations using a code-minus-carrier (CMC) function;
receive the accuracy improvement request and a second set of GPS data from the mobile device over the established internet connection, the second set of GPS data describing a geoposition of the mobile device and having a time of collection that coincides with a time of collection of the time-stamped first sets of GPS data, wherein the first and second sets of GPS data each includes respective code phase information, carrier-phase information, and pseudo-range information from each of the GPS satellites;
generate, via a predetermined GPS position correction technique, a first corrected geoposition of the mobile device using the processor and the first and second sets of GPS data;
perform a carrier-smoothing operation on the first corrected geoposition using code-smoothing logic in which the carrier-phase information is used to smooth the code phase information and thereby generate a second corrected geoposition; and
transmit the second corrected geoposition over the established internet connection to the mobile device and/or an external response system.

13. The stationary base station of claim 12, wherein the base station is configured to conduct the carrier-smoothing operation by solving an equation comprising:

$$PR_{sm}(k) = \frac{N_f - 1}{N_f} \cdot (PR_{sm}(k-1) + \Delta\Phi(k)) + \frac{1}{N_f} PR(k)$$

where $PR_{sm}$ is a smoothed pseudo-range measurement, $N_f$ is a filter time window, $\alpha\Phi$ is a change in the carrier-phase information, and PR is a corrected pseudo-range measurement of the mobile device.

14. The stationary base station of claim 12, wherein the predetermined GPS position correction technique is a differential correction technique.

15. The stationary base station of claim 14, wherein the predetermined GPS position correction technique is a Real-Time Kinematic (RTK) technique using the code phase information, the pseudo-range information, and the carrier phase information.

16. A mobile device comprising:
a global positioning system (GPS) receiver configured to receive a time-stamped set of GPS data from each of a plurality of Earth-orbiting GPS satellites;
a chipset or a processor in communication with the GPS receiver; and
memory on which is recorded instructions that, when executed by the processor, causes the mobile device to process the recorded instructions to:
receive a user input indicative of a request for improved GPS location accuracy of the portable mobile device wherein the mobile device is further configured to generate an accuracy improvement request and transmit the accuracy improvement request to obtain a correction from the selected base station in response to a received user input;
responsive to receipt of the user input, select a base station from a plurality of base stations using a code-minus-carrier (CMC) function;
establish an internet connection between the mobile device and the selected base station and transmit the accuracy improvement request to the selected base station in response to the user input to the mobile device, wherein the mobile device is a cell phone, a tablet computer, or other portable electronic device;
receive another time-stamped set of GPS data from the stationary base station over the established internet connection describing a reference geoposition of the stationary base station, wherein respective times of collection of the time-stamped sets of GPS data from the mobile device and the stationary base station coincide, the time-stamped sets of GPS data each including respective code phase information, carrier-phase information, and pseudo-range information from each of the GPS satellites;
generate, via a predetermined GPS position correction technique, a first corrected geoposition of the mobile device using the processor and the first and second sets of GPS data;
perform a carrier-smoothing operation on the first corrected geoposition to thereby generate a second corrected geoposition, including using code-smoothing logic in which the carrier-phase information is used to smooth the code phase information; and
execute a control action of the mobile device and/or an external response system using the second corrected geoposition.

17. The mobile device of claim 16, wherein the mobile device is configured to perform the carrier-smoothing operation by solving an equation comprising:

$$PR_{sm}(k) = \frac{N_f - 1}{N_f} \cdot (PR_{sm}(k-1) + \Delta\Phi(k)) + \frac{1}{N_f} PR(k)$$

where $PR_{sm}$ is a smoothed pseudo-range measurement, $N_f$ is a filter time window, $\alpha\Phi$ is a change in the carrier-phase information, and PR is a corrected pseudo-range measurement of the mobile device.

18. The mobile device of claim 16, wherein the predetermined GPS position correction technique is a differential correction technique.

19. The mobile device of claim 16, wherein the predetermined GPS position correction technique is a Real-Time Kinematic (RTK) technique using the code phase information, pseudo-range information, and carrier-phase information.

20. The mobile device of claim 16, wherein the mobile device is further configured to generate an accuracy improvement request and transmit the accuracy improvement request to the selected base station in response to a touch input to a display screen of the mobile device, and wherein the touch input is the received user input.

* * * * *